United States Patent [19]

Doman

[11] Patent Number: 5,085,512
[45] Date of Patent: Feb. 4, 1992

[54] APPARATUS FOR THE MOVING OF LIQUID, PASTY AND/OR POURABLE MEDIA

[76] Inventor: Michael Doman, Travemunder Allee 63, 2400 Lübeck, Fed. Rep. of Germany

[21] Appl. No.: 610,457

[22] Filed: Nov. 8, 1990

Related U.S. Application Data

[63] Continuation of Ser. No. 352,476, May 16, 1989, abandoned.

[30] Foreign Application Priority Data

May 16, 1988 [DE] Fed. Rep. of Germany ....... 3816654

[51] Int. Cl.⁵ .................. B01F 11/00; F16H 21/46
[52] U.S. Cl. ........................... 366/219; 74/96; 366/241
[58] Field of Search .......................... 366/241

[56] References Cited

U.S. PATENT DOCUMENTS

| 1,057,053 | 3/1913 | Halliday ........................ 74/86 |
| 2,302,804 | 1/1942 | Schatz . | |
| 2,594,904 | 4/1952 | Frohring ................... 366/606 X |
| 2,672,082 | 3/1954 | Frevik ...................... 74/96 X |
| 2,991,657 | 7/1961 | Schatz ........................ 74/86 X |

FOREIGN PATENT DOCUMENTS

| 589452 | 11/1933 | Fed. Rep. of Germany . | |
| 1507896 | 7/1969 | Fed. Rep. of Germany . | |
| 2941421 | 4/1981 | Fed. Rep. of Germany . | |
| 586066 | 3/1977 | Switzerland . | |
| 456628 | 2/1975 | U.S.S.R. ........................ 366/219 |
| 780871 | 11/1980 | U.S.S.R. ........................ 366/219 |
| 895485 | 1/1982 | U.S.S.R. ........................ 366/219 |
| 1291424 | 2/1987 | U.S.S.R. ........................ 366/208 |

Primary Examiner—Harvey C. Hornsby
Assistant Examiner—Scott J. Haugland
Attorney, Agent, or Firm—Chilton, Alix & Van Kirk

[57] ABSTRACT

The apparatus for the moving of articles, vessels or of liquid, pasty and/or pourable media has an articulated system with at least six links (1 to 6), each of which is connected to two neighboring links (1 to 6) in each case so as to swivel about axes of articulation (A12 to A61) to form a closed articulated chain. The swivel axes (A12 to A61) of each element (1 to 6) form fixed angles of articulation (W1 to W6). At least one link (2) is connected to an article, the vessel or a means of moving the media.

14 Claims, 7 Drawing Sheets

APPARATUS FOR THE MOVING OF LIQUID, PASTY AND/OR POURABLE MEDIA

This is a continuation of copending application Ser. No. 352,476 filed May 19, 1989, now abandoned.

DESCRIPTION

The invention relates to an apparatus for the moving of articles, vessels or of liquid, pasty and/or pourable media, which has an articulated system with at least six links, of which each is connected to two neighboring links in each case so as to swivel about axes of articulation to form a closed articulated chain, the article, the vessel or a means for moving the media being connected to at least one link.

A mixing apparatus with an articulated system is known (Swiss Patent Specification 216,760), which allows a better mixing through of liquid and other media than is possible with the usual shaking mixers or other previously known mixers. The vessel with the liquid to be mixed arranged in it executes a varied and complicated motion, so that a good mixing through is obtained. There is, however, the disadvantage that on the mixing motion there is superimposed a continuous rotational motion, that in other words, although the mixing vessel executes a back and forth motion, altogether it does nevertheless turn in one direction. This causes the great disadvantage that it is not possible to provide the mixing container with lines, because they would become wound up. In addition, centrifugal forces occur, which prevent the mixing through or even lead to a separation again. These disadvantages occur due to the chosen type of the articulated system, which uses the kinematics of invertible articulated systems. It is known that such inversion systems consist of rigid links which are swivel-connected to one another, the axes of each two links following each other in the chain being askew to each other, i.e. that the axes or their extensions do not intersect but have a great distance from each other everywhere.

The disadvantage that the mixing vessel turns altogether in one direction more or less continuously also occurs with other known articulated systems (U.S. Pat. No. 2,302,804, German Patent Specification 589,452). In the case of another known machine for mixing (German Offenlegungsschrift 1,507,896), a movement can only occur in the first place if the joints are not straightforward swivel joints but allow movements in several degrees of freedom by being designed, for example, according to claim 8 as rubber links. This machine also has the disadvantage that the moved work bench can only execute a very restricted rotational back and forth motion.

The disadvantage that the mixing vessel executes a directed rotational motion can admittedly be avoided by the mixing vessel being mounted rotatably on an axis taken through the mixing vessel (Swiss Patent Specification 586,066). Then, however, there is on the one hand the disadvantage that the mixing vessel also cannot execute any, or only a very small back and forth swiveling motion, since it does not follow corresponding rotational movements of the shaft 10, so that the mixing operation will be less effective than with a mixing vessel which carries out such a back and forth swiveling motion. On the other hand, it is very difficult, with glass vessels in particular, to mount them on the axis.

The object of the invention is to create a versatile apparatus of the type mentioned at the beginning with which the said media can not only be mixed better in an advantageous way, without directed rotational movements, hindering line connections, but also can be set in a directed linear motion.

The way of achieving this according to the invention is that for each two neighboring swivel axes of the articulated system or their extension to intersect at a point in each case or to pass by each other at a small distance and by the angles between neighboring swivel axes having fixed values.

Thus, in contrast to the known apparatus, use is not made of the kinematics of invertible articulated systems, which is characterized by a constant direction of rotation being superimposed on it, but the kinematics of a movement system which deliberately excludes a superimposed constant rotational motion. It is then achieved by this different articulated system that the links of the articulated system no longer have to rotate about their own axis in a constant direction, but can only swivel back and forth about this axis. In addition, the type of the connection of the links and joint elements is different. Due to these differences, a clear improvement in the mixing operation is then achieved in a surprising way.

If one of the links is connected rigidly to a vessel, in which the mixing through is to be performed, this vessel no longer carries out any directed rotation during the varied shaking and tumbling motion. Rather, only a strong swiveling back and forth by a certain maximum angle takes place. As a result, it is possible, for example, continually to add liquids or additives or to draw off liquids by simple hoses. Electric leads can also be easily connected to the vessel, which may serve for heating and for measurement or control of the operations. Complicated connections which may take up a permanent rotational movement are not necessary for the hoses or for the wires.

A particularly advantageous embodiment, which is particularly simple, is distinguished by the fact that neighboring swivel axes or their extensions intersect in each case at a point and they have six links that, of three points of intersection, between which there is another one arranged in each case, at least one in each case lies on the one side and at least one in each case lies on the other side of a plane which is taken through the three other points of intersection, and that opposite sides S12 and S45, S23 and S56, S34 and S61 and opposite angles W1 and W4, W2 and W5, W3 and W6 are equally long and equally large, respectively.

A further very advantageous embodiment is distinguished by the fact that it has seven links.

The axes of articulation make possible a swiveling movement between neighboring links. In the case of a further advantageous embodiment, the axes of articulation are screw axes, so that, when carrying out a back and forth swiveling movement, the two links move apart and subsequently approach each other again. As a result, the mixing effect is intensified.

A particularly simple design is obtained if all angles of articulation are equally large, in particular are 90°, and all the articulated sides are equally long.

In the case of an alternative embodiment, it is not the case that one of the links is connected to at least one movable container. Rather, the entire apparatus is arranged in a container, which may be fixed. In this case, the apparatus moves in the container and thereby mixes the liquid or the other medium through. For this purpose, it is provided that one or more of the links are connected by laminar or tab-shaped elements.

Instead of fixed laminar elements, it may also be provided that a membrane is fitted between the links, which upon movement of the links carries out a varied movement.

As mentioned, these apparatuses can be used for the mixing through of liquids and other media in stationary containers, although it is not ruled out that these containers in turn also execute a movement.

However, the movement of the links, with the laminar elements fixed thereto, can also be used for generating a directed liquid flow. In this case, it is expediently provided that the apparatus has stationary baffles for the media. In particular whenever the apparatus is arranged in a tubular element, it may be used as a liquid pump. But the apparatus can also be used as a drive, by water flowing through the tubular element and driven by the apparatus being used for drive purposes. However, such a tubular element may also be dispensed with.

As can be easily shown, it is completely equivalent if it is provided for two neighboring links to be replaced by one link which is connected at the point of intersection of the axes to the neighboring links with the aid of joints with more than one degree of freedom. Instead of the ball joint, two swivel joints may also be used, the swivel axes of which are at right angles to each other.

If it is provided that two links are driven, the necessary angular movements of the drive are reduced to half.

The apparatus at the same time allows various mixing operations to be carried out or more material to be mixed at once if more than one container which is moved by the apparatus is provided.

It has proved to be particularly expedient if one of the axes embraces the container like a pulley belt.

A better mixing or else a better movement of the media is obtained if it is provided that the apparatus has a plurality of articulated chains, two neighboring links of each articulated chain being rigidly connected to two neighboring links of another articulated chain.

In the case of an advantagous embodiment, either the containers or else the links are provided with means to increase the motion of the media. For example, blow openings or jet nozzles could be provided in membranes or stirring blades. On the walls of the container or of the links there may be propellers provided, which in turn either idle in the medium or else are driven. This makes the drive particularly simple since, as mentioned, the supply lines do not require any complicated swivel connections.

It is not absolutely necessary to provide in actual fact six or seven swivel joints, as they have already been described above. Rather, embodiments which are also completely or essentially equivalent are possible. These embodiments are the subjects of subclaims.

The invention is described below using advantageous embodiments with reference to the attached drawings, in which.

Figure 7:
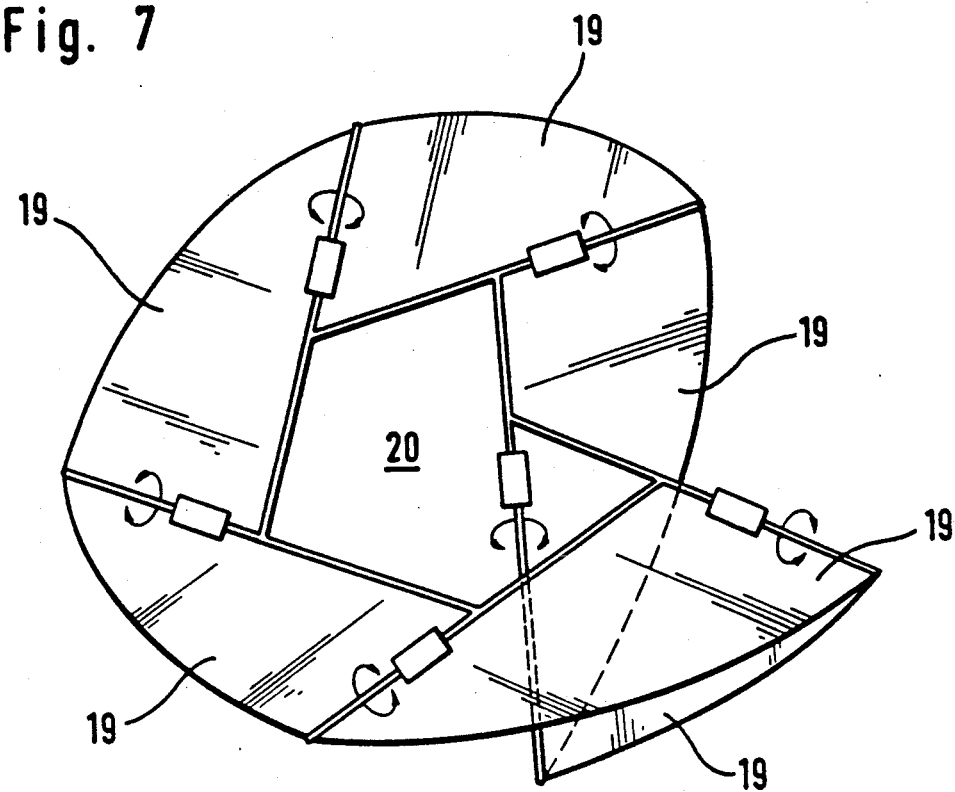

FIG. 6(a)–6(f) show six examples of six-link articulated systems, in which the laminar elements have various forms;

FIG. 7 shows a different type of a six-link articulated system.

Figure 8:
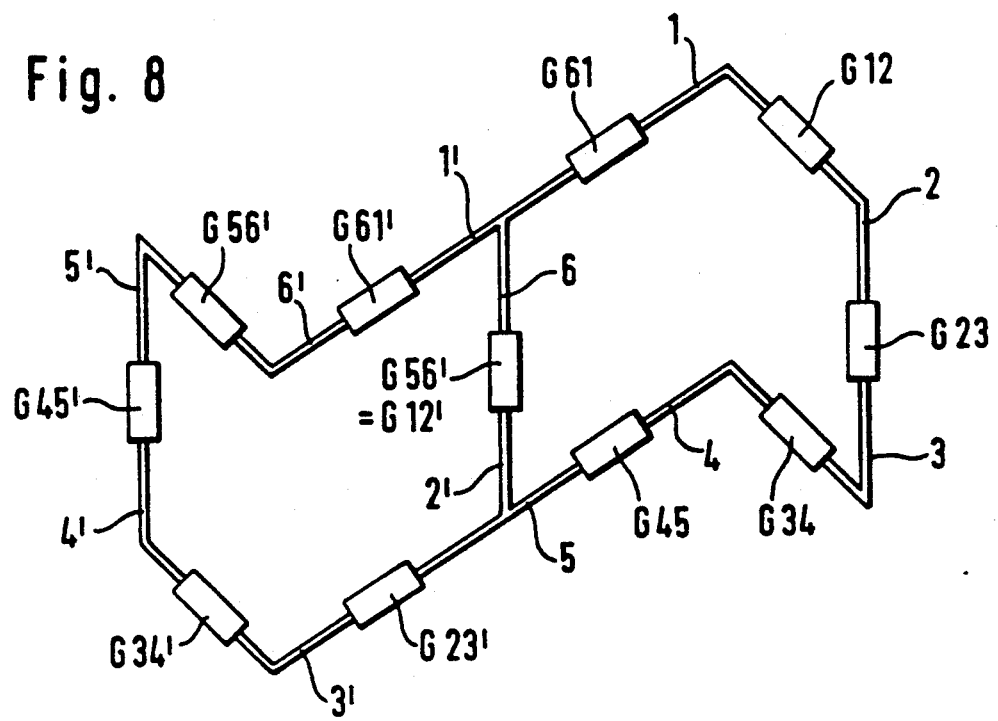
Figure 9:
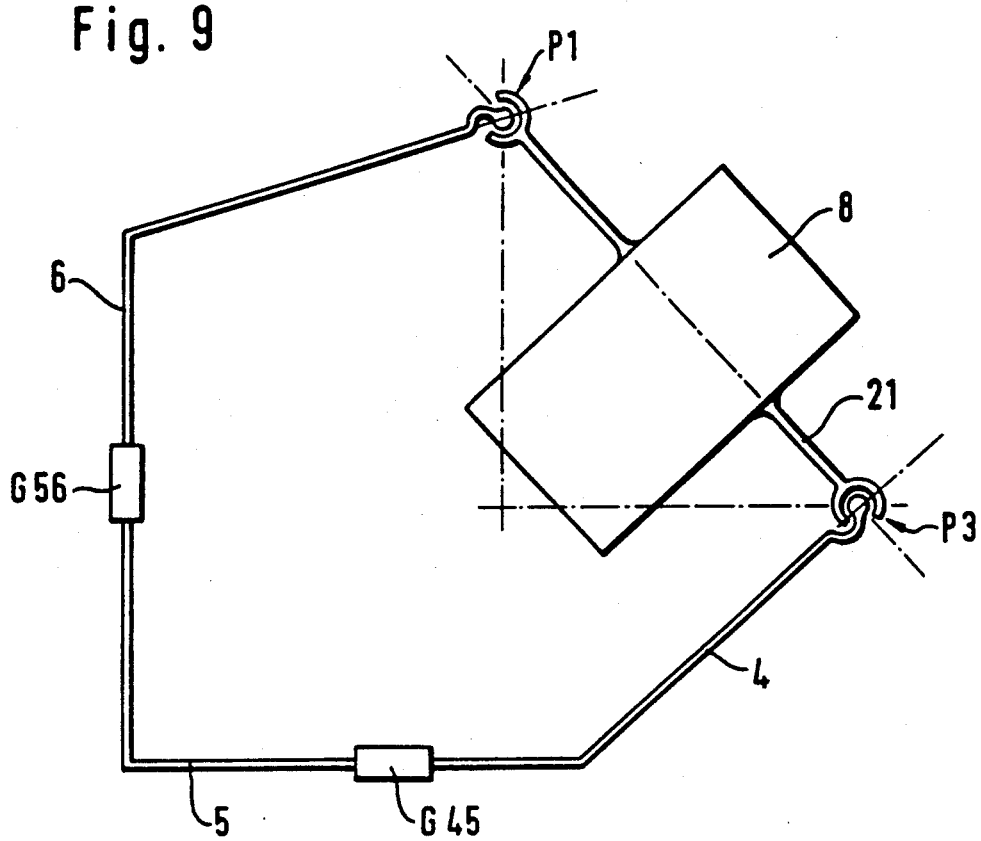
Figure 10:
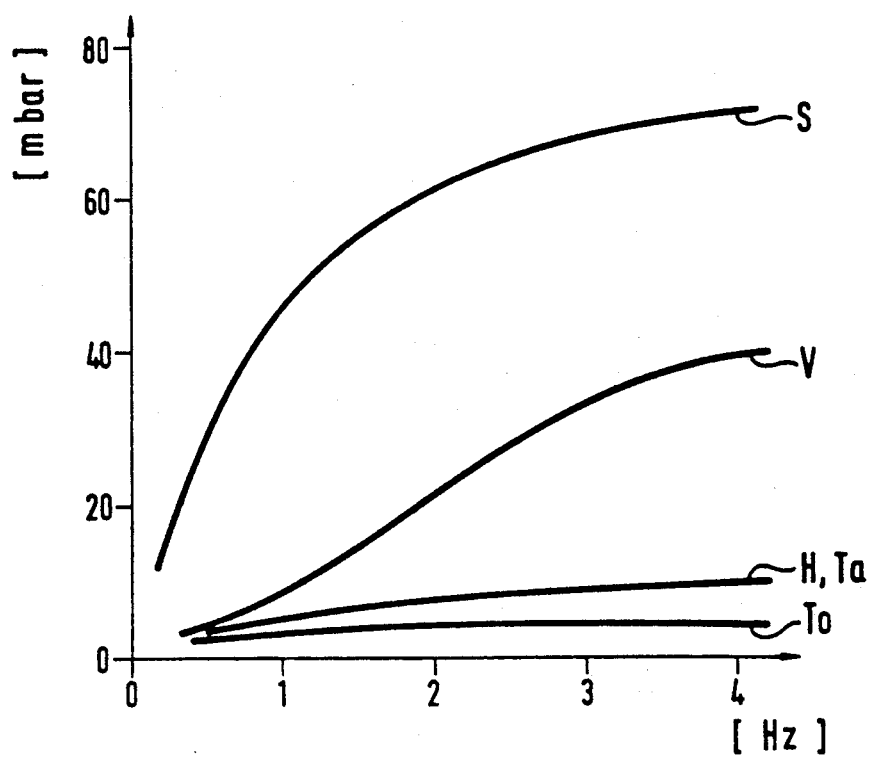

FIG. 8 shows a combination of two interconnected six-link articulated systems;

FIG. 9 shows another embodiment, in which the swivel joints are in some cases replaced by ball joints; and FIG. 10 shows a graphic representation for comparison of the effectiveness of various mixing apparatuses.

Figure 1:
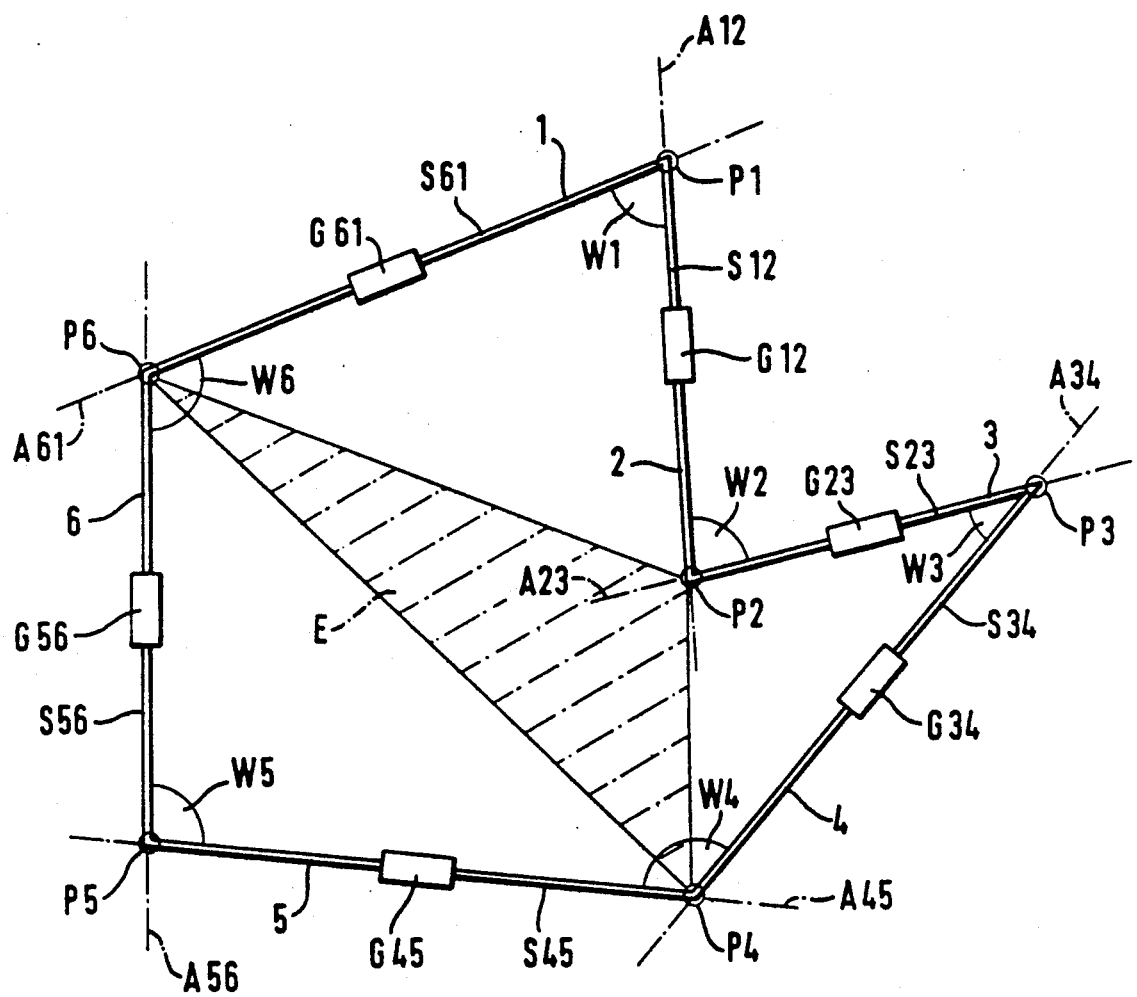
FIG. 1 shows the diagram of a first articulated system, which can be used for the invention.
Figure 2:
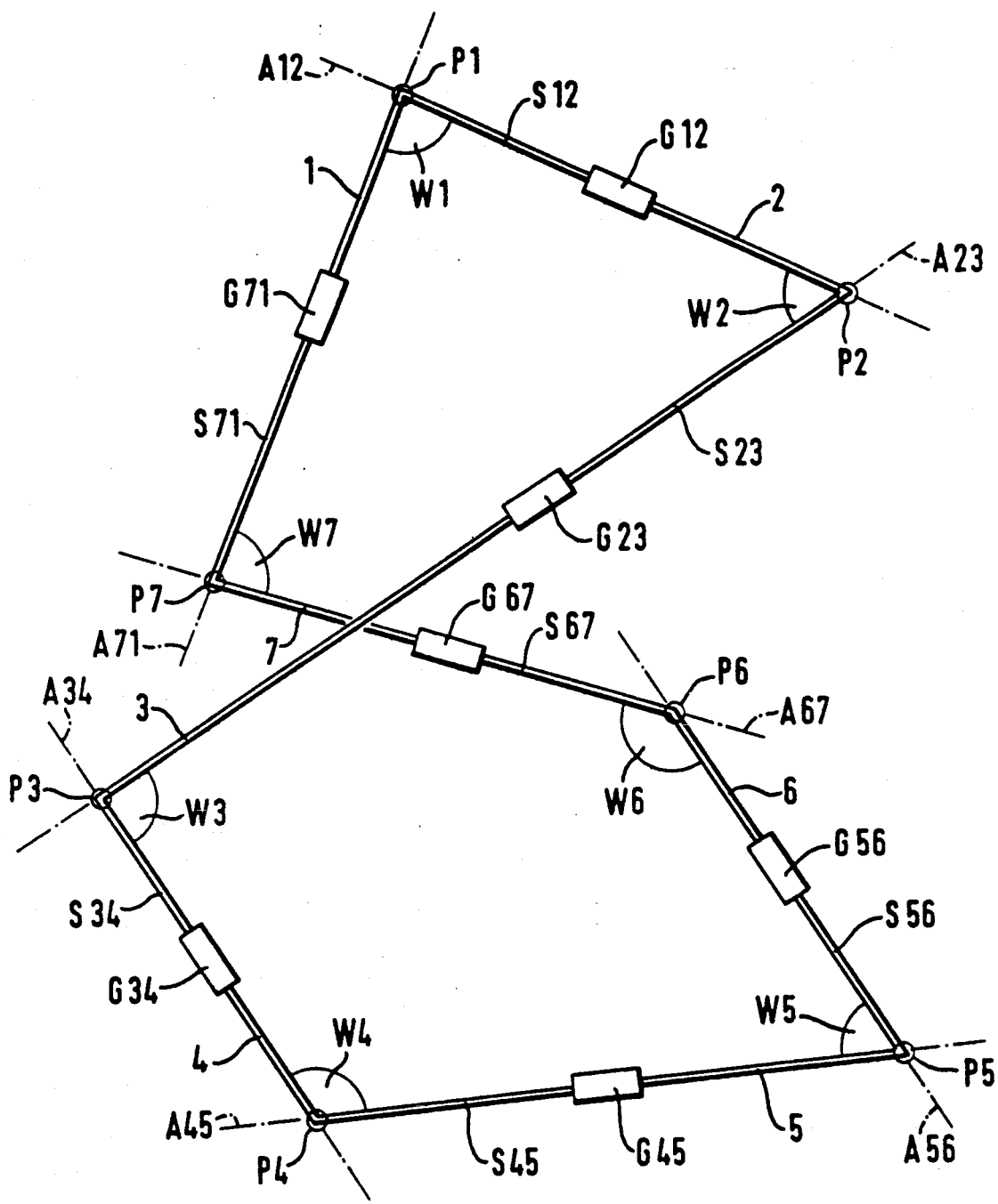
FIG. 2 shows the diagram of a second articulated system, which can be used for the invention.

In FIGS. 1 and 2, the principles of two different articulated systems are shown. The articulated systems consist of links 1 to 6 and 1 to 7, respectively, which have at their ends two swivel axes $A12$, $A23$, $A34$ . . . , the extensions of which intersect at points $P1$, $P2$, $P3$, $P4$, . . . at a fixed angle $W1$, $W2$, $W3$, $W4$, . . . or pass by each other at a small distance. On the swivel axes are arranged the swivel joints $G12$, $G23$, $G32$, . . . to $G71$. If the swivel axes pass by each other, an offset piece V is produced, which can be measured as a straight line which is perpendicular to the two swivel axes passing by each other.

In order that the swiveling capability of the articulated system is assured, V may not exceed a certain maximum value Vmax. The links 1 to 6 and 1 to 7 may in this case be designed essentially as struts or else be, for example, laminar elements. At the swivel axes $A12$, $A23$, $A34$, etc., the links 1, 2, 3 . . . are interconnected to neighboring links 2, 3, 4, etc. in such a way that a relative swiveling of neighboring links can take place about this axis. In this case, the axes may also be designed as screw axes, so that, on swiveling, the neighboring links simultaneously approach each other or move apart.

If the thus-formed articulated chain is held in place at one of the links and another link is driven, the complete articulated chain (apart from the held element) carries out a varied tumbling or oscillating swivel motion or a reversing rotary tilting motion.

The angles $W1$, $W2$ . . . and the sides $S12$, $S23$, . . . (i.e. the distances between neighboring points $P1$ and $P2$, $P2$ and $P3$, . . . ) may have any values, which preferably lie in the range of 60°–120°. In the case of the six-link articulated chain, opposite articulated sides $S12$ and $S45$, $S23$ and $S56$, $S34$ and $S61$ are equally long, opposite angles likewise being equal. However, all sides may, for example in the case of the seven-link articulated chain, be equally long and all angles equally large.

By suitable choice of the parameters, as they have been described in particular in the claims, it can be achieved that the articulated chain has precisely one degree of freedom, that is it carries out a movement under forced guidance, which is essential for the purpose to be achieved. In the case of a six-link articulated chain it is necessary in particular that, of the three points of intersection $P1$, $P3$ and $P5$, at least one is on the one side and at least one is on the other side of a plane E which is taken through the three other points of intersection $P2$, $P4$ and $P6$.

Figure 3:
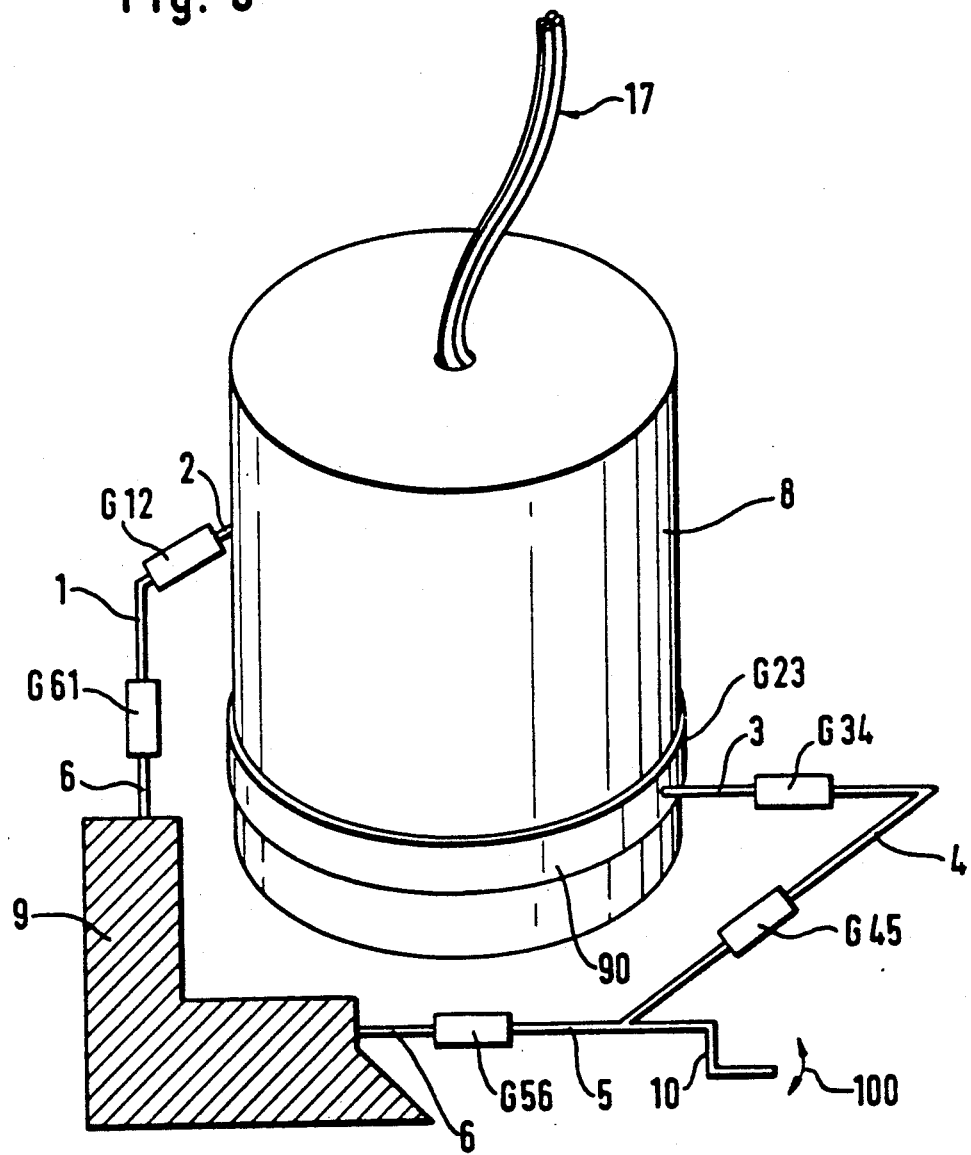
FIG. 3 shows a mixing apparatus with a container, using the articulated system of FIG. 1.

In the case of the embodiment of FIG. 3, the link 2 is designed as container 8, or is connected to a container 8, while the link 6 is fastened rigidly to a frame 9. On the link 5 there acts a drive 10, by which the articulated chain and thus the container 8 is set in the reversing rotary tilting motion, so that the medium in the container 8 is mixed through in a very effective way. The drive 10 must in this case execute a back and forth motion, which is indicated by the double-headed arrow 100. Such drives are known per se, so that a more detailed description has been dispensed with. The container 8 is mounted rotatably in a pulley belt 90, which forms the joint G23.

In FIG. 3, flexible elements, in the form of hoses or wires, are indicated, by which liquids can be supplied or removed, by which measurements can be taken, by which energy can be supplied for example for heating or for the operation of devices which are arranged in the container 8. Other applications are also possible. Since the container 8 does not carry out any directed rotation, complicated swivel-joint or swivel-contact connections are not necessary as long as the elements 17 are sufficiently flexible.

Figure 4:
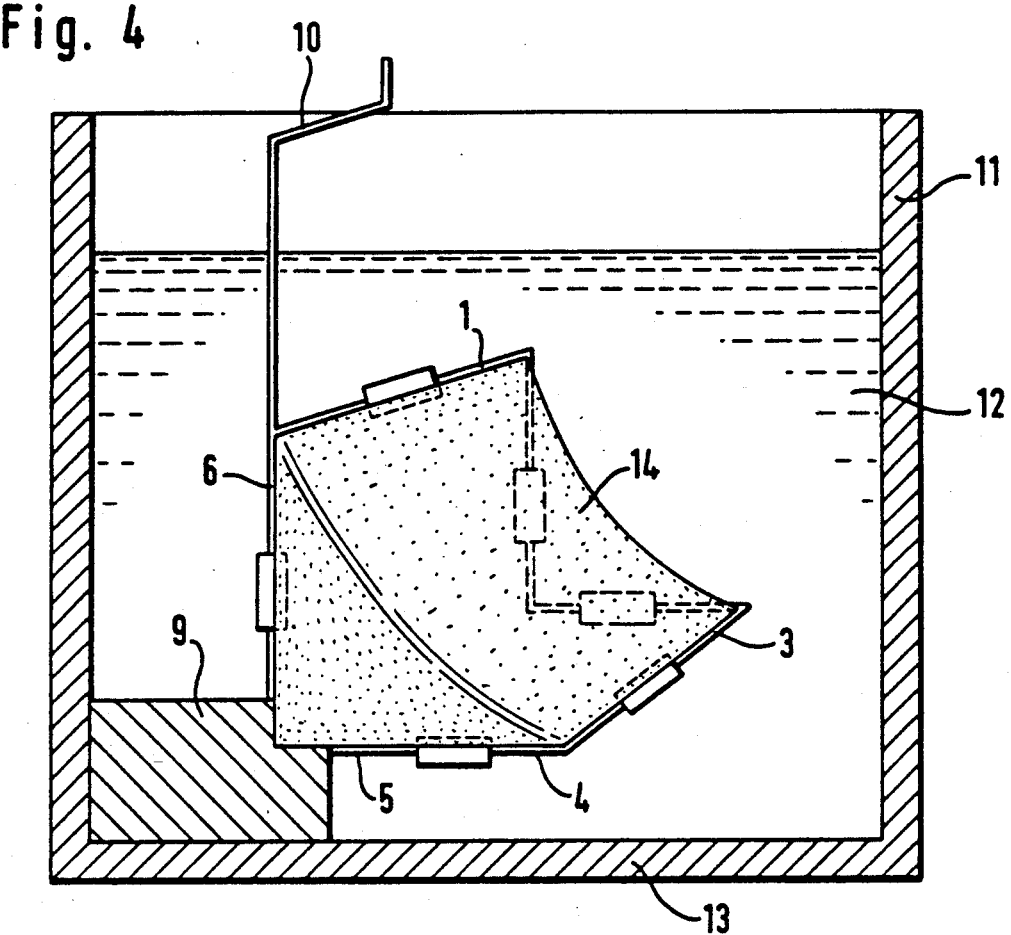
FIG. 4 shows another mixing apparatus, using the articulated system of FIG. 1.

In the case of the embodiment of FIG. 4, the in this case six-link articulated chain is arranged in a container 11, which is filled with the liquid 12 to be mixed. The link 6 is fastened rigidly at 9 to the container bottom, while the link 6 is provided with a drive 10, so that it can be set into the described movements. Between the links, in this case designed in the form of struts, there is fitted a membrane 14, which is set in a motion by which the liquid 12 is mixed through. The membrane may also be double-walled and perforated, so that a gas, which is pumped into the liquid, can leave through the holes.

Figure 5:
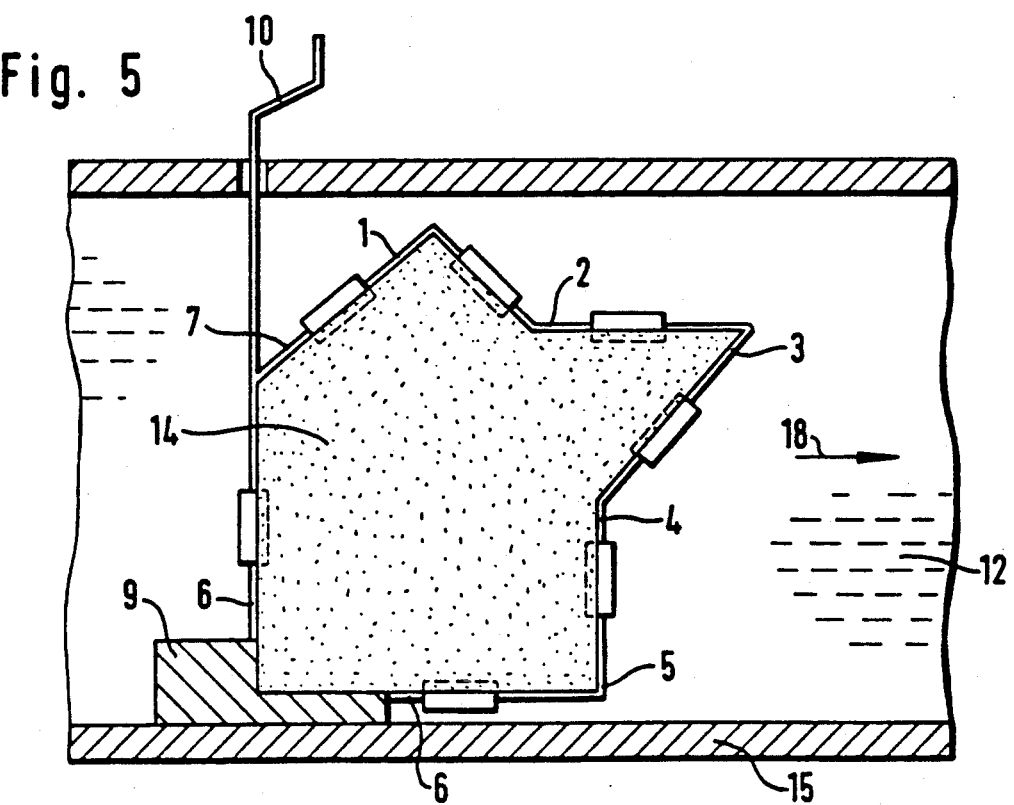
FIG. 5 shows a pump or drive apparatus, using the articulated system of FIG. 2.
Figure 6A:
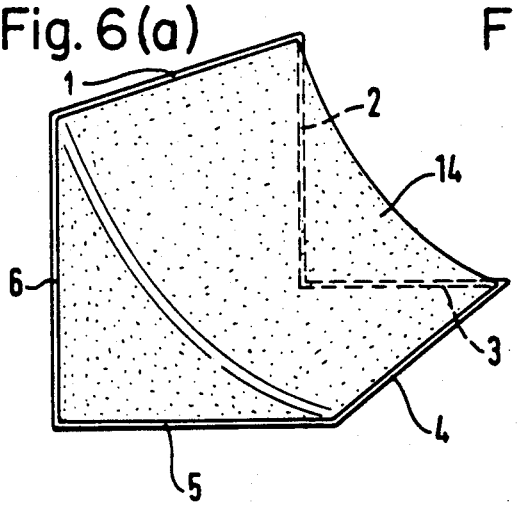
Figure 6B:
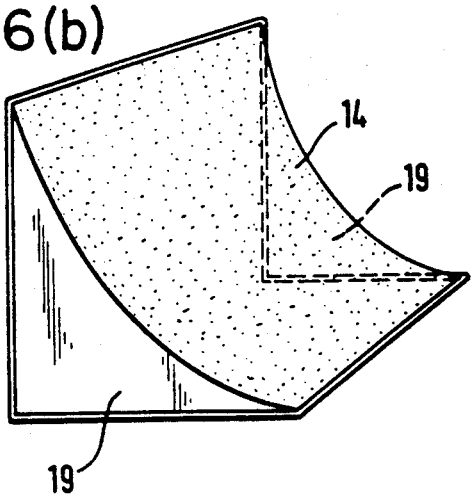
Figure 6C:
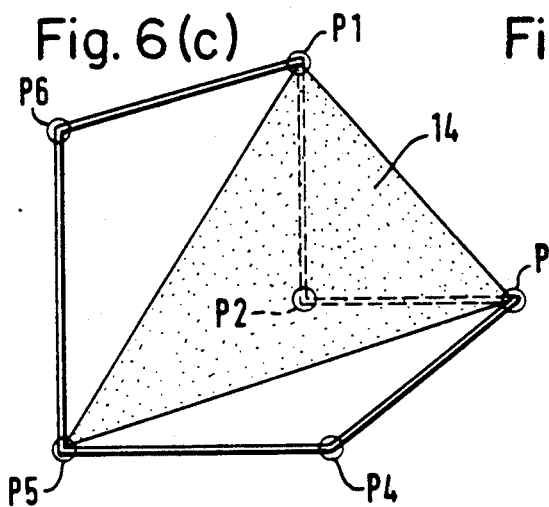
Figure 6D:
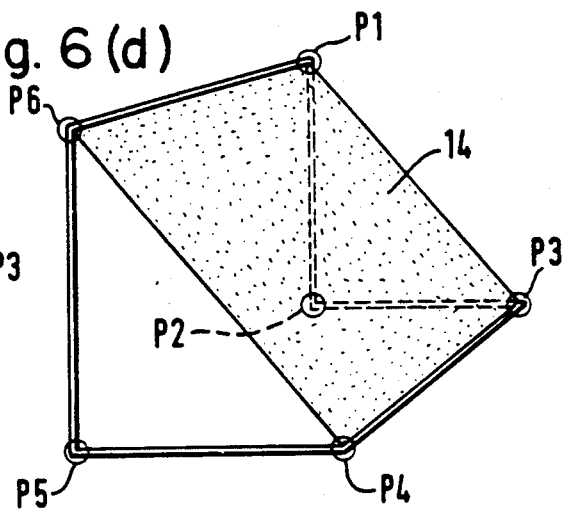
Figure 6E:
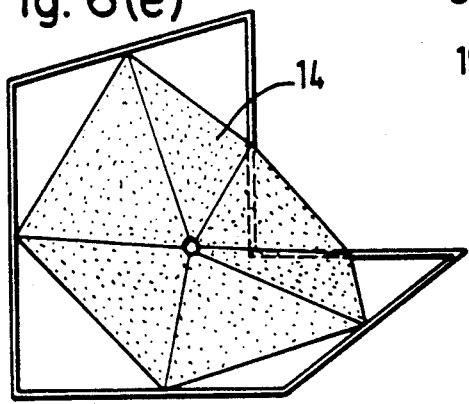
Figure 6F:
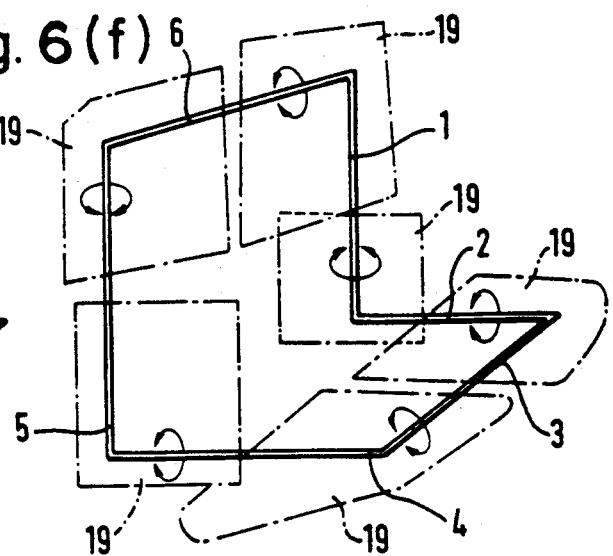

In the embodiment of FIG. 5, a seven-link articulated chain is fastened at 9, to be precise inside a tube 15. The articulated chain is driven by a drive 10. The links have spanning over them a membrane 14, so that, upon movement, corresponding forces are exerted on the liquid, in this case 12 a drive of the liquid being moved in the direction of the arrow 18. As a result, a pumping motion can be exerted on the liquid, or else a driving motion can be created, for example for a water-craft, which is very effective.

In the embodiments of FIG. 6, six-link articulated systems are shown, which are provided with laminar elements. In the case of the embodiment (a), a membrane 14 is connected directly to the links 1 to 6, or fitted between these links 1 to 6. The membrane may in this case be fastened rigidly to the links or be pushed rotatably onto the same (for example with the aid of an edge in the form of a hose). The joints between the links are not shown in the figure. They may be arranged approximately in the center of the straight section, but also in the vicinity of a corner of the articulated chain.

In the case of the embodiment (b) in FIG. 6, two rigid, essentially triangular surfaces 19 are provided, the membrane 14 then being connected to two sides of the articulated system and to one side each of the two triangular rigid surfaces 19. The joints between the links are provided in a suitable way, for example by tubular bearings on the two sides of the triangular surface 19 which are not connected to the membrane 14. Each surface 19 would then be rigidly connected to a link and by a swivel connection to two other links.

In the case of the embodiment (c), the membrane 14 is fastened at three corner points, namely the corner points P1, P3 and P5, that is to each second corner point. It is also possible to replace the membrane 14 by a rigid surface, since the triangle formed by the corner points P1, P3 and P5 does not alter its form. Between the edges of the membrane 14 or the corresponding rigid surface 19 and the nearest articulated sides, membranes may again be fitted.

In the case of the embodiment (d), a flexible membrane 14 is fastened at four corner points P1, P3, P4 and P6. The membrane 14 has in this case essentially rectangular shape. Of course, on movement of the articulated system, the membrane is deformed, in particular is deformed in the form of a saddle.

In the case of the embodiment (e), the membrane 14 is connected at six points, in each case to points lying approximately in the center of the articulated sides.

In the case of the embodiment (f), each of the links 1 to 6 is connected to a rigid surface 19 or consists essentially of such a rigid surface 19.

In the case of the embodiment of FIG. 7, the laminar elements 19 of the links 1 to 6 are interconnected in the manner of a hinge. In the center, in each case an opening 20 is free, which in turn may be covered by a membrane.

In FIG. 8, two articulated systems are shown, namely the articulated system shown on the right with the links 1 to 6 and the articulated system shown on the left, of precisely identical design, with the links 1' to 6'. The two articulated systems have two links and a joint in common. Thus, the link 6 of the right-hand articulated system is connected rigidly to the link 1' of the left-hand articulated system. The link 5 of the right-hand articulated system is connected rigidly to the link 2' of the left-hand system. The joints G56 of the right-hand articulated system and G12' of the left-hand articulated system are a common joint. By the common elements, the movement of the one articulated system is transferred to the other. In a similar way, more than two articulated systems may also be interconnected.

As already mentioned, parts of the articulated chain may be designed in such a way that they can be replaced by equivalent forms, in which case then fewer links are necessary but some at least have to be interconnected by bearings which allow a movement in more than one degree of freedom. Thus, the embodiment of FIG. 9 is equivalent to that of FIG. 1. Only two swivel joints G45 and G56 are provided, while at the points P1 and P3 a ball joint or some other joint with more than one degree of freedom is arranged in each case. This embodiment thus has only four joints altogether.

The following comparative tests were conducted with comparable mixers which likewise carry out no directed rotational motion and therefore could be connected in a simple way with flexible supply lines.

In a known horizontal mixer, the back and forth motion takes place in one direction, to be precise approximately in the horizontal, the amplitude being 48 mm and the shaking frequency infinitely variable from 0 to 4 Hz.

In the vertical mixer, production was carried out by turning the horizontal mixer through 90°, so that the motion takes place in the vertical. Frequency and amplitude were the same as in the case of the horizontal mixer.

In the case of the tumbling mixer, a simultaneous motion in three mutually perpendicular directions takes place, which leads to a tumbling, very irregular motion.

In the case of the torsional mixer, the motion takes place by back and forth swiveling about a horizontal axis, the angle of torsion being 58° and the shaking frequency infinitely variable from 0 to 5 Hz.

The mixer according to the invention was used for comparison.

To characterize the individual mixers, two independent physical properties were investigated: the impact pressure and the dispersing effect.

Impact pressure. When shaking a liquid in a closed container, it is thrown against the container walls. The impact of the liquid briefly causes an increase in pressure, the so-called impact pressure. Due to the incompressibility of liquids, the impact pressure is transferred to the entire body of liquid. The impact pressure is measured by a pressure sensor which is located inside the liquid. The impact pressure is a surface force. It describes the force which is exerted on the surface of particles which are in the liquid (pressure=force per unit area).

Dispersing effect. In the following, this refers to the property of the shaker to raise medium-sized solids in the solution which are heavier than water from the bottom and distribute them as widely as possible in the body of water during the course of the shaking motion. This is a significant mixing property. Small ceramic rings were used (height and diameter=8 mm).

The results are represented in FIG. 10 as a function of the shaking frequency.

In the said figure, H denotes the curve for the horizontal mixer, V that for the vertical mixer, Ta that for the tumbling mixer, To that for the torsional mixer and S that for the mixer of the invention. The impact pressure was measured with a pressure sensor in the liquid. The same cylindrical container, which had an inside radius of 5 cm and an inside height of 18 cm as well as a volume of 1,413 ml and was filled with 850 ml of tap water was used for all the mixers.

FIG. 10 clearly shows that the mixer according to the invention produces the highest values. While the torsional mixer, due to its balanced rotational motion, only provides small pressure increases, which do not exceed 5 millibar (mb), in the case of the horizontal mixer and tumbling mixer the impact pressure increases with increasing shaking frequency up to about a maximum of 10 mb at 4 Hz. In the case of the vertical shaker, 4 times the value of the horizontal mixer is obtained at 4 Hz, in the case of the mixer of the invention 7 times the value is obtained. The particular strength of the mixer according to the invention lies in the low frequency range of about 1 Hz, where it is 10 times superior to the vertical mixer.

The dispersing effect was measured as a function of the shaking frequency, which is given in cycles per second or Hz.

The same cylindrical container (inside dimensions: r=5 cm, h=18 cm, volume=1,413 ml) were used for all 5 mixer types. Into the container filled with 800 ml of tap water there were additionally filled 200 small ceramic rings, which had a total volume of 30 ml and a total weight of 83 g; dimensions of the rings: 8 mm outside diameter, 8 mm height. Each ring weighed 0.415 g, the specific weight of the ceramic material was 2.8 g/cm$^3$.

Horizontal mixer:

Up to 1.5 Hz, the rings remained on the bottom of the container. From 1.6 Hz, 3-5 rings were raised about 1 cm into the liquid. At 4 Hz, scarcely 10 rings floated about 2 cm above the remaining 190 rings, which were rattled about on the bottom.

Vertical mixer:

Up to about 3 Hz, the rings remained on the bottom. At 4 Hz, about half the rings were 3 cm high in the water and executed a hopping motion. Up to about 25% of the body of water was then filled with dispersed rings. The other half of the rings were rattled about on the bottom.

Tumbling mixer:

Same as horizontal mixer.

Torsional mixer:

At 1 Hz, isolated rings at the ends of the container were thrown 1-2 cm into the liquid. At 2 Hz, it was about 20% of the rings. At 4 Hz, about 60% of the rings were taken up and dispersed in the lower half of the liquid. The concentration of the rings was greatest at the right and left ends of the container.

Mixer of the invention:

Already at 1 Hz, virtually all rings were taken up and transported through the entire volume of liquid. With increasing shaking frequency, a violent increase in the dispersing process occurred.

These results of the dispersing effect of medium-sized solids show that the mixer according to the invention is also best suited here. While horizontal mixer and tumbling mixer can only move the solids slightly up from the bottom at the frequencies investigated, in the vertical mixer it was succeeded at 4 Hz already to raise a little all of the shaken product from the bottom. The best result after the mixer according to the invention is exhibited, however, by the torsional mixer, although it had the lowest values in the impact pressure measurements. This documents very clearly that impact pressure and dispersing effect, in which the mixer according to the invention produced the best values, are two mutually independent parameters.

The better mixing properties may be used for varied purposes, for example also for biochemical processes in which a multiplicity of parameters have to be optimized, often in a very complex way. For example, the correct distribution of the reaction partners and reaction products in the reaction solution is particularly critical whenever a so-called three-phase mixture is involved, in which the reaction partners are simultaneously present in the solid, liquid and gaseous phases and the reaction sequences take place at interfaces, which must be present in sufficiently high number and quality. The mixing can in this case be performed with the system according to the invention both in moved containers and in stationary containers, in which the mixture is set in motion by a membrane which is fitted in the form of a saddle between the links and likewise does not bring about any rotational component of the motion but sets the liquid in rhythmic oscillations, similarly to dolphin fins.

I claim:

1. An articulated apparatus adapted to be actuated for the purpose of moving media in the vicinity of the apparatus, comprising:

a plurality of at least six links, each of said links connected only serially by two swivel connections to a respective two neighboring ones of said links to form a closed articulated chain having only said plurality of links, said swivel connections defining at least six swivel axes (A12, A23, ... ), each of said swivel axes substantially intersecting angularly with at least two swivel axes of said neighboring links at a respective at least two positions (P1, P2, ... ), wherein each angle (W1, W2, ... ) formed by the intersection of two swivel axes at a position is fixed,
only a first one of said links is fixed in space, and only two other, second and third of said links, are connected to the first link;

first means connected to at least one link other than said first, second, or third links, for contacting and moving the media in response to the articulated movement of the chain; and second means, connected only to one of the second or third links, for imparting reciprocating motion to said one second or third link and articulated motion to the chain, for moving said media.

2. The apparatus as claimed in claim 1, wherein it has seven links (1 to 7).

3. The apparatus as claimed in claim 1, wherein the swivel axes (A12 to A71) are screw axes.

4. The apparatus as claimed in claim 1, wherein said first means is a movable container (8) connected to at least one of the links (1 to 7).

5. The apparatus as claimed in claim 4, wherein the movable container is mounted in one of the links such that one of the axes (A12 to A71) passes through the container (8).

6. Apparatus as claimed in claim 4, wherein said container is connected to a link and extends through one of the swivel joints.

7. The apparatus as claimed in claim 1, wherein the means for moving the media comprises a laminar element.

8. The apparatus as claimed in claim 7, wherein the laminar element is are fitted between the links (1 to 7).

9. The apparatus as claimed in claim 7, wherein the laminar element has openings through which liquids or gases in to the medium and mixed with it can flow.

10. The apparatus as claimed in claim 1, further including a tubular element (15) in which the links are arranged.

11. The apparatus as claimed in claim 1, wherein the apparatus has six links, thereby defining an apparatus having six swivel axes which substantially intersect at six positions at a respective six angles.

12. The apparatus as claimed in claim 1, wherein all the links define six sides (S12, S13, ... S61) of the apparatus lying substantially on the six axes, respectively, each said side being substantially the same length and each said angle being substantially the same size.

13. The apparatus as claimed in claim 12, wherein neighboring swivel axes intersect in each case at a point and the apparatus has six links (1 to 6) connected together such that for three non-neighboring points of intersection (P2,P4,P6) defining a plane, the three other points of intersection (P1,P3,P5), include at least one point that lies on one side and at least one point that lies on the other side of the plane.

14. The apparatus as claimed in claim 1, wherein the links define at least six sides (S12, S13, ... ) of the apparatus, each lying substantially on one axis, each said side being substantially the same length and each said angle being substantially the same size.

* * * * *

UNITED STATES PATENT AND TRADEMARK OFFICE
CERTIFICATE OF CORRECTION

PATENT NO. : 5,085,512
DATED : February 4, 1992
INVENTOR(S) : Michael Doman

It is certified that error appears in the above-indentified patent and that said Letters Patent is hereby corrected as shown below:

Column 9, line 29, delete "are".

Column 10, line 3, delete "to".

Signed and Sealed this

Fifth Day of November, 1996

Attest:

BRUCE LEHMAN

Attesting Officer     Commissioner of Patents and Trademarks